United States Patent
Norris

[15] 3,671,459
[45] June 20, 1972

[54] HYDRATED EMULSIFIER
[72] Inventor: Max E. Norris, Parma, Ohio
[73] Assignee: SCM Corporation, Cleveland, Ohio
[22] Filed: July 27, 1970
[21] Appl. No.: 58,658

[52] U.S. Cl. ................................. 252/356, 99/86, 99/92, 252/DIG. 1
[51] Int. Cl. .......................................... B01f 17/34
[58] Field of Search ......................... 252/356, DIG. 1

[56] References Cited

UNITED STATES PATENTS 3,433,645 3/1969 Egan et al. ................................. 99/90
2,508,393 5/1950 Jaeger ....................................... 99/123

Primary Examiner—Richard D. Lovering
Attorney—Mertoni H. Douthitt, Harold M. Baum, Howard G. Bruss, Jr., Russell L. Brewer and James E. Carson

[57] ABSTRACT

An improved hydrated emulsifier having from 30–65 percent lipoidal emulsifier component emulsified with from 70–35 percent water, the improvement comprising including at least about 30 percent by weight of the lipoidal emulsifier component of an edible alkoxylated partial fatty acid ester of glycerol.

4 Claims, No Drawings

HYDRATED EMULSIFIER

Hydrated lipoidal emulsifier components for making edible comestibles such as bakery goods, e.g., cakes, bread, rolls, have been utilized widely. Hydrating of certain types of these lipoidal emulsifiers with from about 35–75 percent water activate the emulsifier thereby increasing its surface active properties. One type of emulsifier which has been successfully hydrated is polyoxyethylene sorbitan or mannitan esters, the esters obtained by condensing ethylene oxide with sorbitan or mannitan esters. Monoglycerides as well as glycol esters, e.g., propylene glycol monostearate, in combination with fat are typical of other emulsifiers which have also been hydrated.

It has been found that an edible hydrated emulsifier containing from about 30–65 percent lipoidal emulsifier component and from 70–35 percent water, at least about 30 percent by weight of the lipoidal component being an edible alkoxylated partial fatty acid ester of glycerol is an effective emulsifier.

Advantages of the emulsifier compositions set forth herein include: the ability to hydrate at lower temperatures than other lipoidal emulsifiers, e.g., 70° F. as opposed to 140°–160° F. for hard monoglycerides or sorbitan and polyoxyethylene sorbitan esters; excellent functionality of the emulsifier at room temperature (70° F.) for producing bakery products and particularly cake batters of low specific gravity and cakes of high specific volume; excellent emulsion stability of the hydrated emulsifier over an extended period of time; and lower cost of resultant emulsifier without loss of functionality.

The above hydrated emulsifier can be used in food applications where conventional hydrated emulsifiers have been used heretofore. Therefore, the emulsifier can be used in preparing bakery goods, e.g., cakes, rolls, doughnuts, muffins, cookies, etc., salad dressing and oil sauces, confectioners products, e.g., icings, frostings, and cream fillings or for frozen desserts such as ice cream and sherbert.

From about 0.15–10 percent emulsifier basis weight of the edible comestible can be used in preparing such comestible, but the proportion of emulsifier in the composition can be varied as desired. Typically from about 1–3 percent emulsifier basis weight of the composition is used in preparing most edible comestibles set forth above.

The alkoxylated partial fatty acid esters of glycerol are polyether products of glycerol and alkylene oxide typically obtained by condensing glycerol with ethylene oxide or propylene oxide followed by esterification, or by condensing partial glycerides with ethylene oxide. The latter type of alkoxylated partial fatty acid ester of glycerol, referred to as ethoxylated monoglyceride, is shown in U.S. Pat. No. 3,433,645 and such type is hereby incorporated by reference. The alkylene oxides suitable for reaction with glycerol are the esters of ethylene oxide and propylene oxide and preferably from 10–30 moles of total oxide are reacted or condensed with one mole of glycerin. Emulsifiers containing more than 50 mole percent propylene oxide basis total mole percent of alkylene oxide in the partial fatty acid esters have a tendency to lose their hydrophilicity and, therefore, are not preferred. For reasons of efficiency and economy, ethylene oxide is the preferred alkylene oxide for condensing with glycerol or esters thereof in preparing the alkoxylated partial fatty acid esters.

Esterification of the condensed reaction product to form the partial esters can be accomplished by conventional methods, e.g., by reacting fatty acids with such condensed reaction product. The fatty acid esters and those acids typically having from 10–24 carbon atoms, saturated or unsaturated, including the hydroxy acids. Preferably the fatty acids include the $C_{14-18}$ acids, e.g., oleic, stearic, palmitic and lactic. Also, esterification can result through an ester interchange, e.g., by reacting the condensed product with a glyceride. No esterification step is required when the partial ester is produced by the manner set forth in U.S. Pat. No. 3,433,645, e.g., ethoxylation of monoglycerides, as the fatty acid portion is already present in the form of glycerides.

The partial esters (those not fully acylated) generally are better adapted for stabilizing and aerating edible compositions than the fully acylated counterparts and therefore are preferred. By partial ester it is meant that the product is a mixture usually consisting of mono and di-esters although some tri-ester including unreacted glycerol may be present in the reaction product. Preferably the partial ester is predominantly a mono-ester. The proportion of partial ester formed where ethylene oxide is reacted with glyceride is controlled by varying the proportion of monoglyceride in the glyceride mixture. The glyceride mixture should contain between 10–90 percent, and preferably between 25–50 percent, monoglyceride by weight of the glyceride mixture for forming the desired products. Generally, the preferred compositions, i.e., alkoxylated partial fatty acid esters, have a hydroxyl value of between about 65–80, an acid value maximum of 2.0, and a saponification value of between about 65–75, these values indicating the degree of acylation of the resultant ester.

By partial glycerides it is meant the mono and di-glycerides. They can be prepared by conventional techniques, e.g., an alcoholysis reaction wherein a triglyceride fat is reacted with glycerin to produce the mono and di-esters. Alternatively, partial glycerides can be prepared by reacting glycerin with a fatty acid in the presence of a catalyst. Partial glycerides prepared by super-glycerinating or by reacting glycerol with fatty acids often contain from about 25–90 percent alpha and β-monoglycerides with the balance being diglyceride, triglycerides or unreacted glycerin. For reasons of efficiency and economy, the commercial glycerides containing 45–55 percent mono-glyceride by weight are employed as the other lipoidal emulsifier components in combination with the alkoxylated partial fatty acid ester of glycerol, although distilled monoglycerides function quite well. Fatty acids used in preparing the partial glycerides are the same as those mentioned heretofore used in preparing the alkoxylated partial fatty acid esters of glycerol.

Optionally other lipoidal emulsifier components can be used in formulating the hydrated emulsifier of this invention and are polyoxyethylene sorbitan and mannitan esters, e.g., polyoxyethylene sorbitan monostearate and polyoxyethylene mannitan monostearate, partial glycerides such as mono and diglycerides heretofore mentioned, propylene glycol esters, e.g., propylene glycol monostearate, propylene glycol mono-ester of peanut oil, soya bean oil, corn oil, and the like, glycerol lactopalmitate, propylene glycol lactostearate, etc. For reasons of efficiency and economy, it is preferred that not more than 10 percent of these lipoidal emulsifier components be present in the hydrated emulsifier composition.

In preparing the hydrated emulsifier set forth herein at least 30 percent, and even up to 100 percent, alkoxylated partial fatty acid ester of glycerol, e.g., ethoxylated monoglyceride by weight of the total lipoidal emulsifier component should be present. When less than 30 percent of the particular alkoxylated partial fatty acid ester of glycerol is employed as the lipoidal emulsifier component, the advantages set forth above often are not achieved. For example, the temperature for hydration often must be increased, especially where the lipoidal emulsifier component is a hard monoglyceride, and resultant plasticity of the emulsifier is reduced. It has been found that a mixture of partial glycerides, e.g., monoglycerides and ethoxylated monoglycerides in a proportion of from about 60 percent monoglyceride:40 percent ethoxylated monoglyceride to 60 percent ethoxylated monoglyceride:40 percent monoglyceride by weight produces excellent comestible products and particularly cakes with high cake volume.

In conventional hydrated emulsifier systems, from about 30–70 percent water basis weight of the total emulsifier composition is used for hydrating the lipoidal emulsifier component. When the water content is increased above about 70 percent by weight, the resultant hydrated emulsifier becomes quite fluid approaching the fluidity of water. Emulsifiers of that viscosity are difficult to handle and for that reason are undesirable. When less than 30 percent water by weight of the emulsifier composition is used for hydration, resultant loss of plasticity and functionality of the emulsifier often results. Functionality refers to the ability of the emulsifier to aerate and stabilize the edible comestible, e.g., the cake batter and resulting cake. For reasons of efficiency and economy, the preferred water content in the hydrated emulsifier should be between about 45–55 percent for achieving desired results. When the water is mixed with the emulsifier component, e.g., ethoxylated monoglyceride, a product in the form of an emulsion results. It is believed the water is physically absorbed by the emulsion rather than adsorbed or chemically reacted to form a water-emulsifier emulsion. The alkoxylated partial fatty acid esters of glycerol have the ability to physically absorb a substantial amount of water without undergoing a phase separation, e.g., water-emulsifier, after formation over a period of several days. In contrast, other emulsifiers, e.g., sorbitan and polyoxyethylene sorbitan esters undergo phase separation in a matter of hours and must be reblended prior to use.

The following specific examples are provided to illustrate preferred embodiments of the invention but are not intended to limit the scope thereof. All parts are parts by weight, all percentages are weight percentages, and all degrees are degrees Fahrenheit, unless otherwise specified.

EXAMPLE 1

A partial glyceride is prepared from a mixture of 90 parts hydrogenated tallow (i.e., a fatty triglyceride), 10 parts glycerin and 0.3 part of powdered potassium hydroxide. This mixture is heated to 320° F. at atmospheric pressure and during such heating, sparged with nitrogen gas. The reaction is terminated after 2 hours and the resulting product, when analyzed, is found to contain approximately 30% monoglyceride, the remainder consisting of di and triglycerides.

EXAMPLE 2

An ethoxylated monoglyceride is prepared by first charging the partial glyceride of Example 1 to a stainless steel autoclave. The autoclave is pressurized with ethylene oxide to about 50 psig., and then heated to a temperature of 340° F. The reaction is allowed to proceed for 15 minutes. Sufficient ethylene oxide is introduced into the autoclave to form an ethoxylated product containing 29 weight percent ethylene oxide based on 100 parts of the ethoxylated mono-glyceride product. The resultant product is a white semi-solid.

EXAMPLE 3

A hydrated emulsifier is prepared by mixing 40 parts of ethoxylated monoglyceride of Example 2 with 60 parts of a commercial partial glyceride product containing 45 percent monoglyceride. Then 125 parts water are added to the mixture of ethoxylated monoglyceride and partial glyceride and agitated until the water is completely absorbed and emulsifier in the lipoidal component. The temperature during agitation is 100° F. The resultant hydrated emulsifier is a white semi-solid and has substantial stability without resulting loss of water from the emulsion after standing for a period of 24 hours.

A cake batter is prepared by mixing dry materials consisting of 449 parts sugar, 476 parts cake flour, 25 parts soya flour, 27 parts baking powder, 1.25 parts cream of tartar, 16 parts whole egg solids, 13 parts egg white solids, 29 parts whey solids, and 6 parts salt in a vessel. In another vessel, 90 parts corn syrup are blended with 600 parts water. Eight parts of the above hydrated emulsifier of Example 3 then are mixed with the dry materials followed by addition of 230 parts of the water-corn syrup dispersion, then mixing, followed by another addition of 230 parts of the water-corn syrup dispersion, and finally the remaining 230 parts of the water-corn syrup dispersion are mixed to form a cake batter. The batter has a specific gravity of 0.65 and the resultant cake produced from this batter has a cake volume of 1500 cc/lb.

A hydrated emulsifier containing a lipoidal component consisting of 80 parts sorbitan monostearate and 20 parts polyoxyethylene sorbitan monostearate (a condensation product of one mole sorbitan monostearate, 20 moles ethylene oxide, sold under the trademark "Tween 60") made by mixing 40 parts lipoidal component with 60 parts water is mixed at a hydrating temperature of 160° F. A cake identical to the cake above except for the addition of this emulsifier for the one in the previous cake yields a cake batter having a specific gravity of 0.78 grams/cc. and a cake volume of 1,210 cc/lb.

What is claimed is:

1. In an edible hydrated emulsifier wherein about 30–65 percent of lipoidal emulsifier component selected from the group consisting of partial fatty acid esters of propylene glycol, glycerol, polyoxyethylene sorbitan, and polyoxyethylene mannitan is emulsified with about 70–35 percent water, the improvement which comprises including at least about 30 percent by weight of said lipoidal emulsifier component, of an edible alkoxylated fatty acid ester of glycerol, said alkoxylated partial fatty acid ester of glycerol being selected from the group consisting of ethoxylated and propoxylated partial fatty acid esters of glycerol and having from 10–30 moles alkoxy groups per mole of glycerol, said fatty acid moiety in said alkoxylated partial fatty acid ester of glycerol having from 10–24 carbon atoms.

2. The composition of claim 1 wherein said alkoxylated partial fatty acid ester of glycerol is an ethoxylated monoglyceride.

3. The composition of claim 2 wherein said lipoidal emulsifier component contains at least 40 percent of a partial glyceride by weight of said lipoidal component.

4. The composition of claim 3 wherein said water is present in a proportion of from about 40–55 percent by weight of said composition.

* * * * *